United States Patent
Long

(10) Patent No.: US 6,678,993 B1
(45) Date of Patent: Jan. 20, 2004

(54) FISHERS APPARATUS

(76) Inventor: Rodney Dale Long, 5121 Edgewood Rd., Adamsville, AL (US) 35005

( * ) Notice: Subject to any disclaimer, the term of this patent is extended or adjusted under 35 U.S.C. 154(b) by 0 days.

(21) Appl. No.: 10/081,701

(22) Filed: Feb. 20, 2002

Related U.S. Application Data

(60) Provisional application No. 60/270,477, filed on Feb. 21, 2001, and provisional application No. 60/276,582, filed on Mar. 15, 2001.

(51) Int. Cl.[7] .......................... A01K 91/06; A01K 85/00
(52) U.S. Cl. ...................... 43/42.72; 43/42.02; 43/42.39
(58) Field of Search ............................... 43/42.72, 26.1, 43/26.2, 42.02, 44.95, 42.39; 24/300, 265 H; 57/210, 224, 225

(56) References Cited

U.S. PATENT DOCUMENTS

| | | | | |
|---|---|---|---|---|
| 1,049,345 A | * | 1/1913 | Dolman | 43/26.2 |
| 1,296,057 A | * | 3/1919 | Ellsworth | 43/42.72 |
| 1,438,476 A | * | 12/1922 | Bley, Sr. | 43/42.72 |
| 2,117,322 A | * | 5/1938 | Hillman | 43/42.72 |
| 2,690,026 A | * | 9/1954 | King | 43/42.02 |
| 2,708,804 A | * | 5/1955 | Kucklick | 43/26.1 |
| 2,759,290 A | | 8/1956 | Strausser | 43/42.72 |
| 2,882,638 A | * | 4/1959 | Moore | 43/26.1 |
| 3,011,284 A | * | 12/1961 | Sawyer | 43/42.72 |
| 3,693,275 A | * | 9/1972 | Craig | 43/42.72 |
| 3,714,730 A | * | 2/1973 | Lloyd | 43/42.72 |
| 3,740,891 A | * | 6/1973 | Rubenstein | 43/42.02 |
| 3,871,123 A | * | 3/1975 | Olson | 43/42.72 |
| 4,843,755 A | * | 7/1989 | Lin | 43/42.72 |
| 4,975,543 A | * | 12/1990 | Saunders | 57/225 |
| 5,111,609 A | * | 5/1992 | Flo | 43/26.1 |
| 5,212,901 A | * | 5/1993 | Bishop et al. | 43/42.72 |
| 5,279,066 A | | 1/1994 | Camera | 43/42.72 |
| 5,442,815 A | * | 8/1995 | Cordova et al. | 57/225 |
| 5,682,652 A | * | 11/1997 | Brody et al. | 24/300 |
| 5,787,633 A | * | 8/1998 | Taylor | 43/42.02 |
| 6,014,794 A | * | 1/2000 | McCoy | 24/300 |
| 6,173,524 B1 | * | 1/2001 | Kinchen, Sr. | 43/44.95 |
| 6,381,940 B1 | * | 5/2002 | Kolmes et al. | 57/210 |

FOREIGN PATENT DOCUMENTS

| | | | | |
|---|---|---|---|---|
| FR | 777171 B1 | * | 2/1935 | 43/42.72 |
| FR | 1215764 B1 | * | 4/1960 | 43/42.72 |
| FR | 1476434 B1 | * | 2/1967 | 43/42.72 |

* cited by examiner

*Primary Examiner*—Darren W. Ark
(74) *Attorney, Agent, or Firm*—Gary K. Price, Esq.; George H. Morgan

(57) ABSTRACT

The present invention, a fishers apparatus, a drag and an elastic member. The elastic member is attached to a fishing line. The apparatus enables a fisher to impart a lifelike motion to the bait which is effective in attracting a fish to strike at the bait.

4 Claims, 15 Drawing Sheets

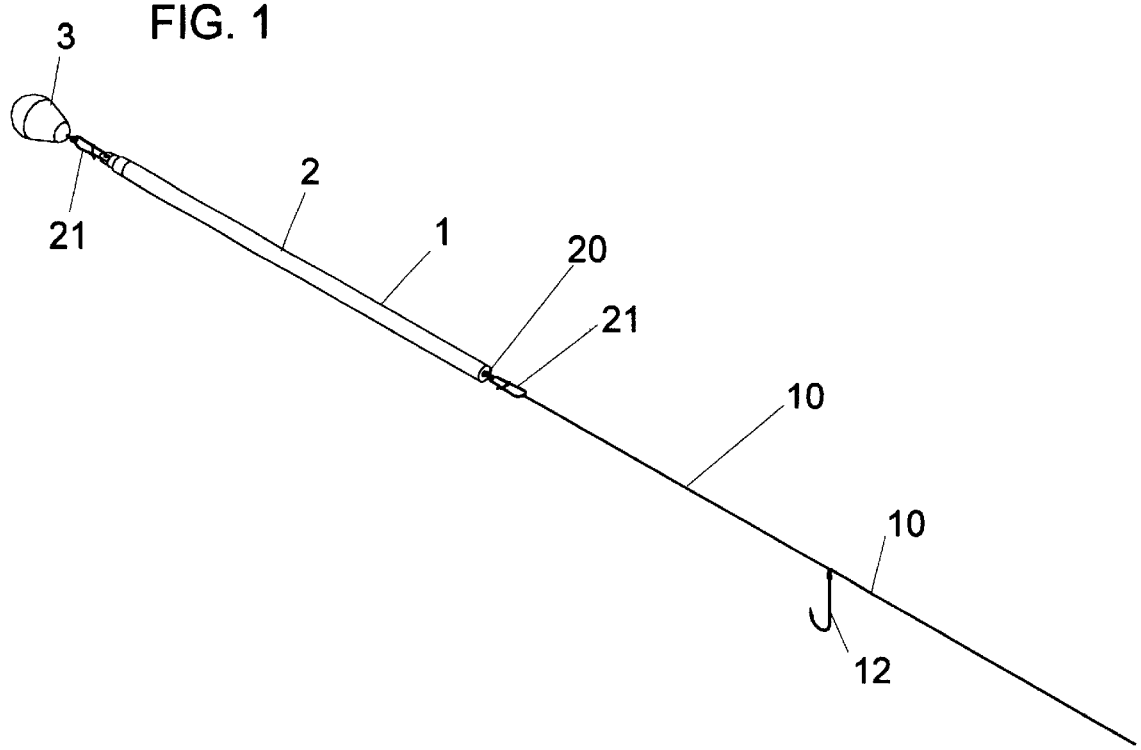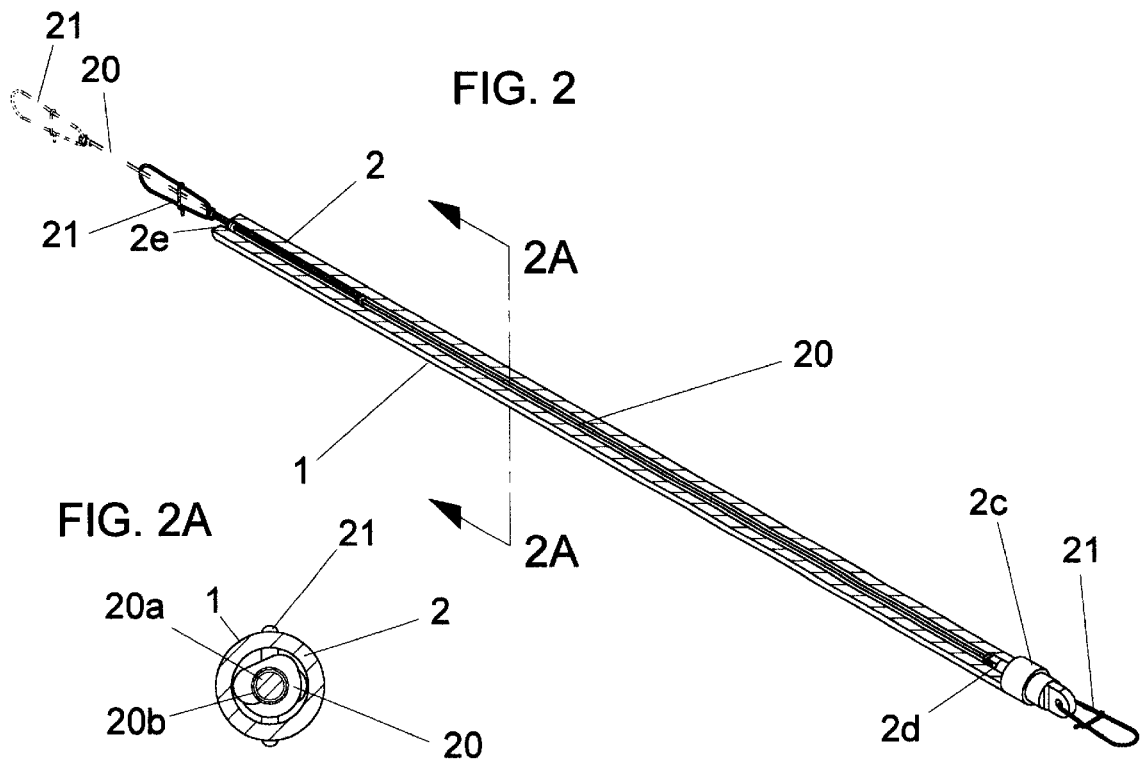

FIG. 6
FIG. 7
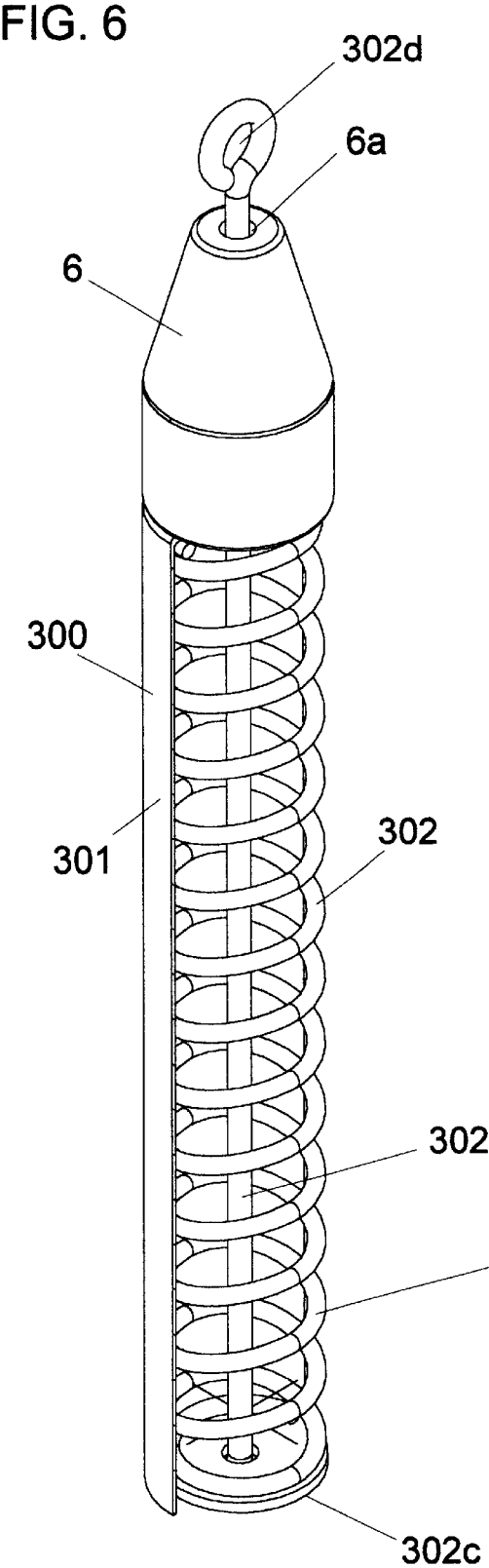
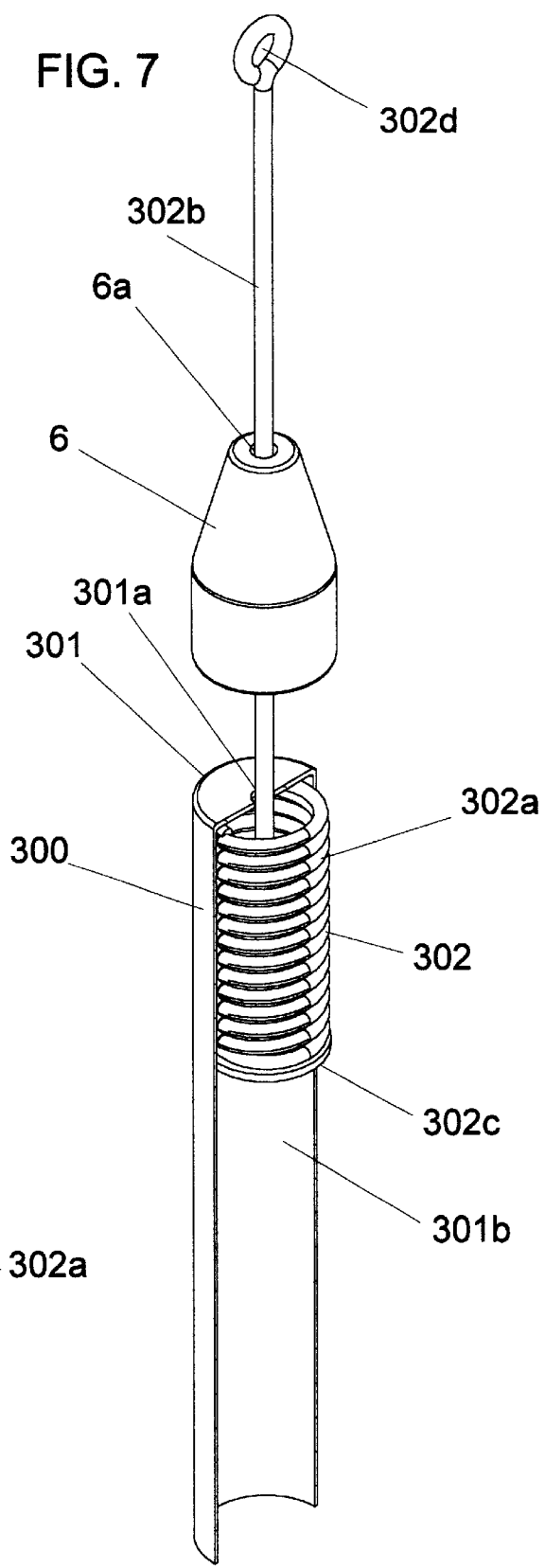

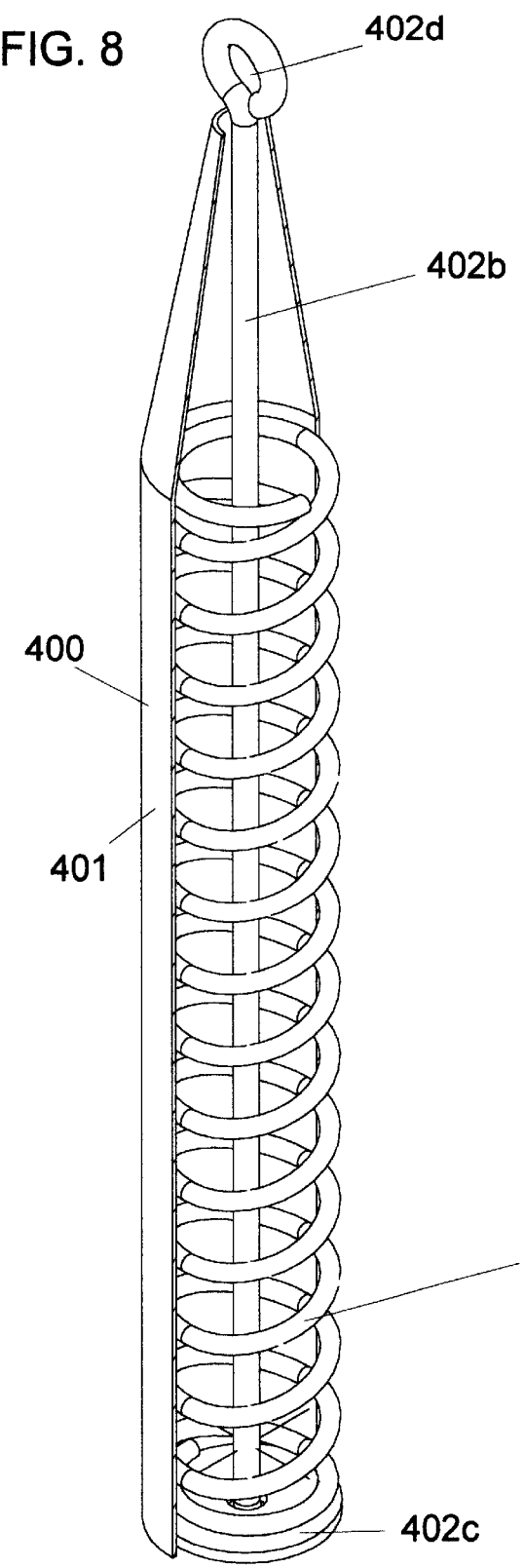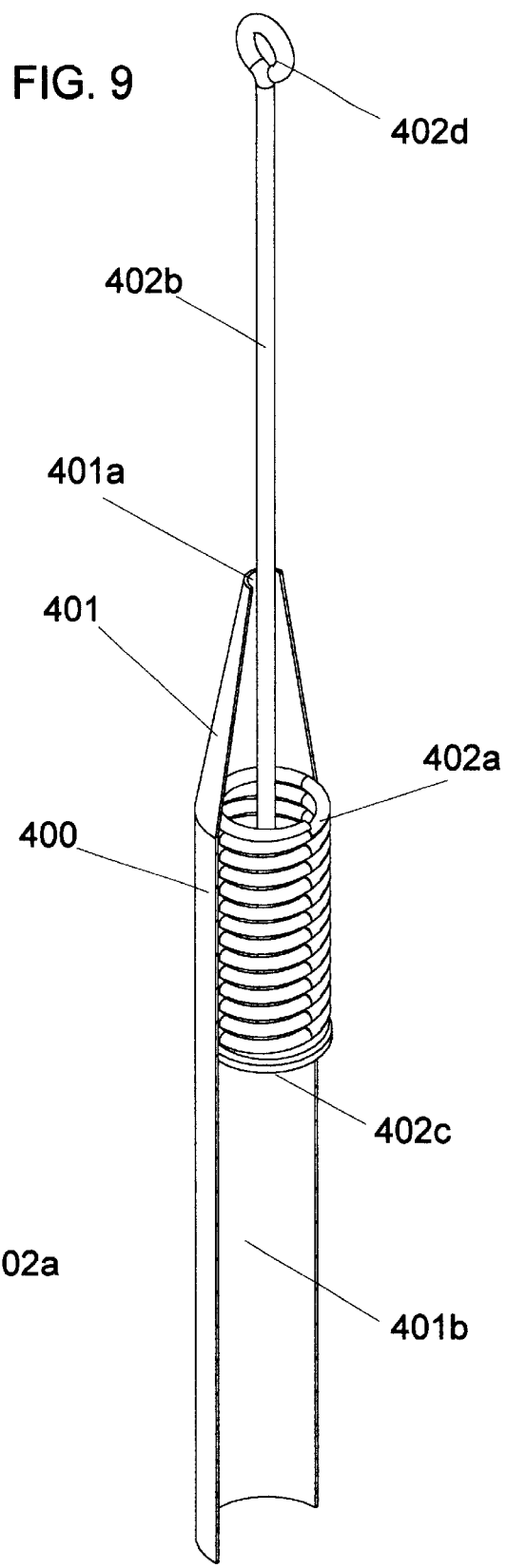

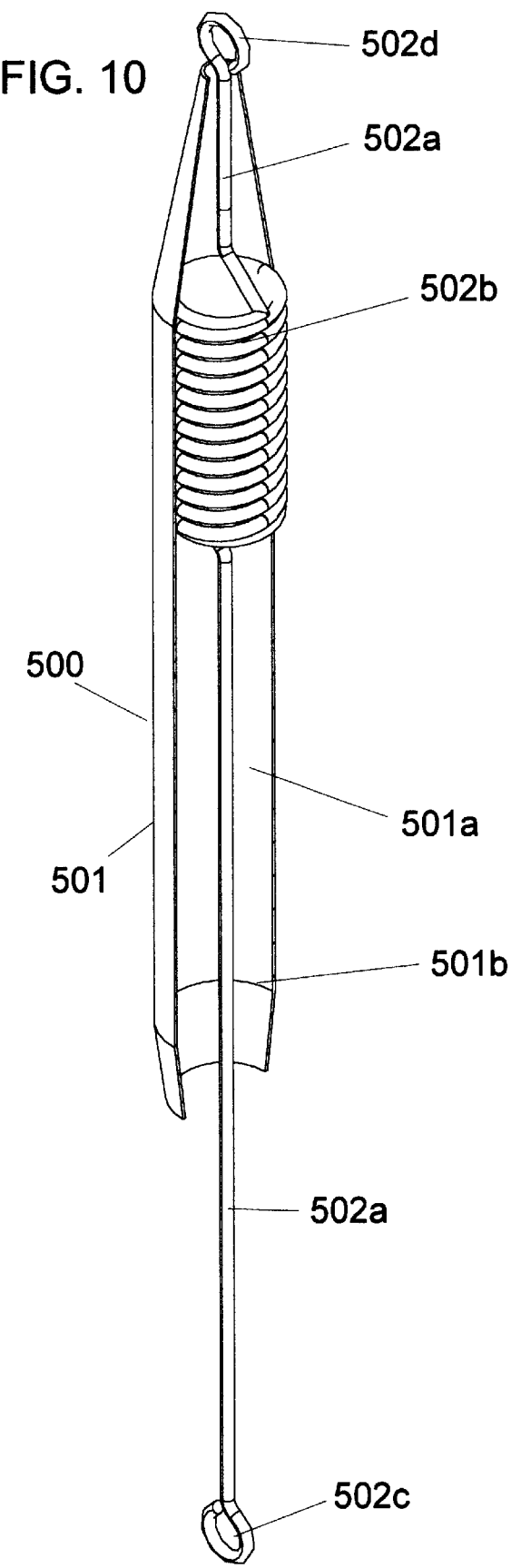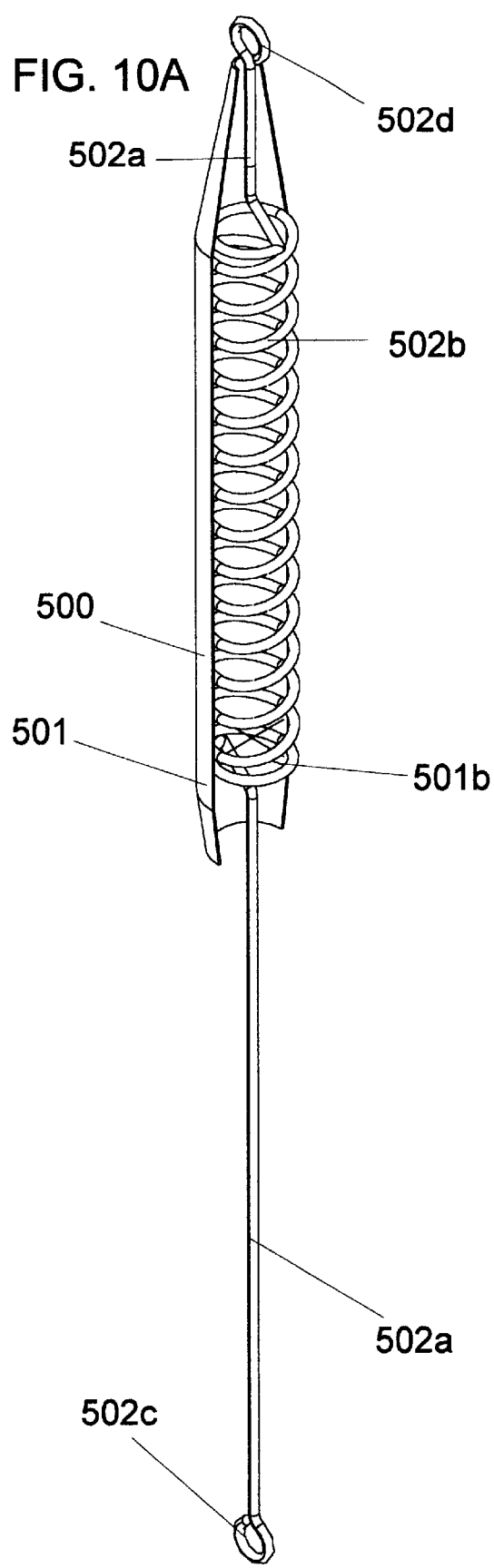

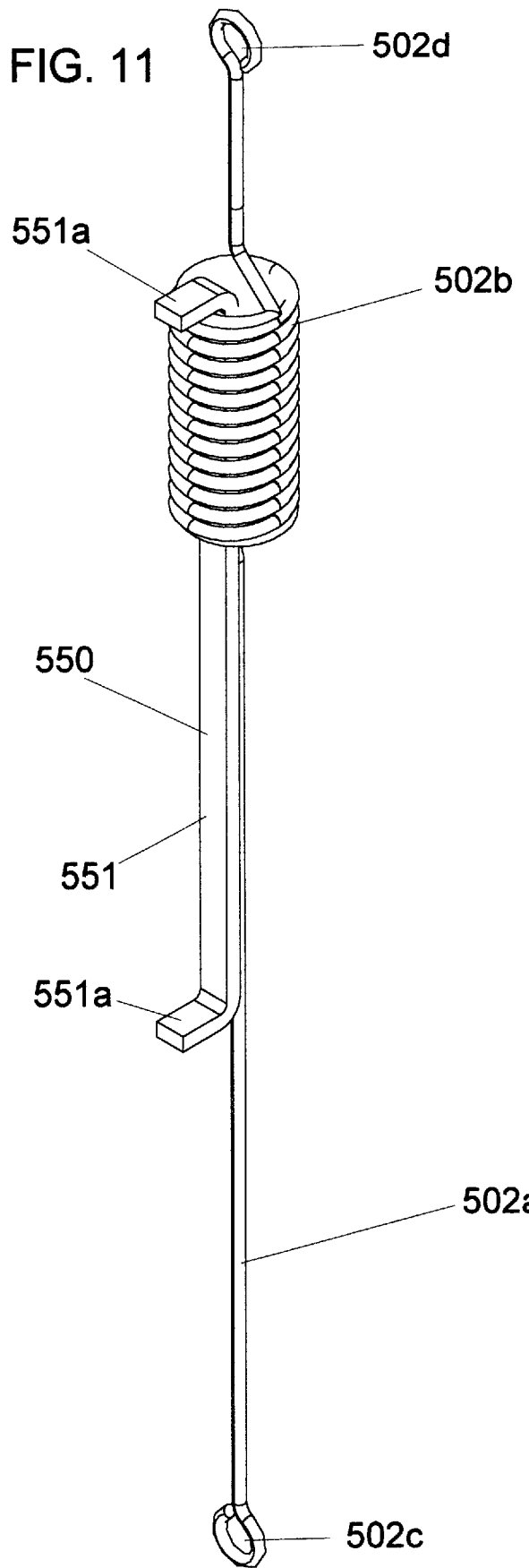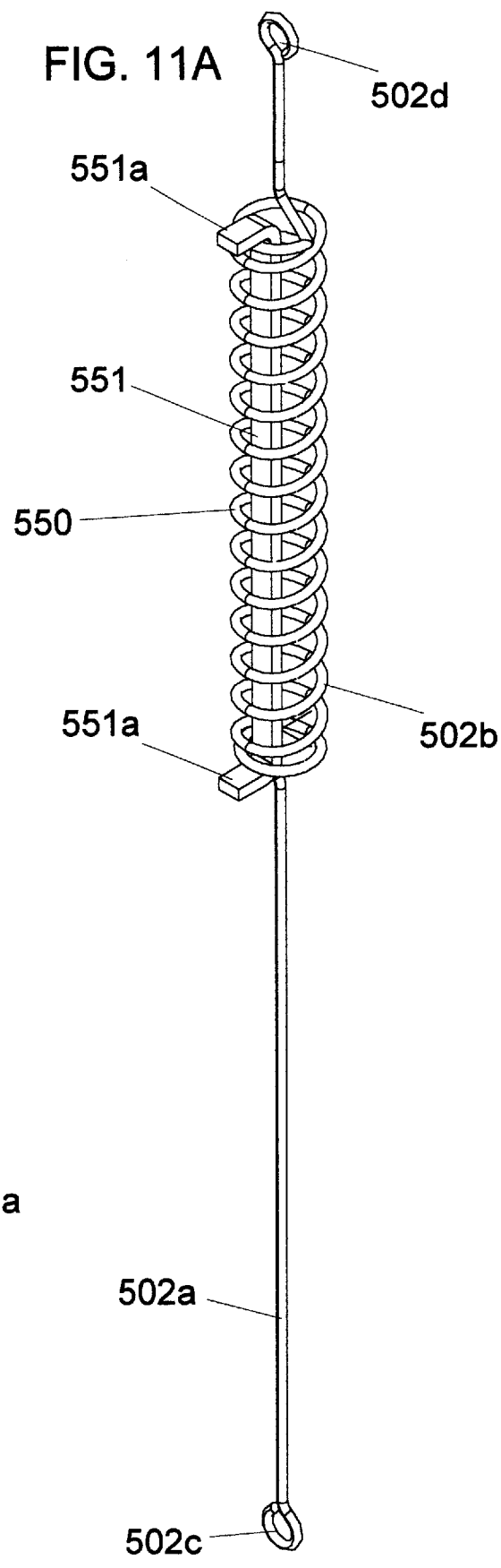

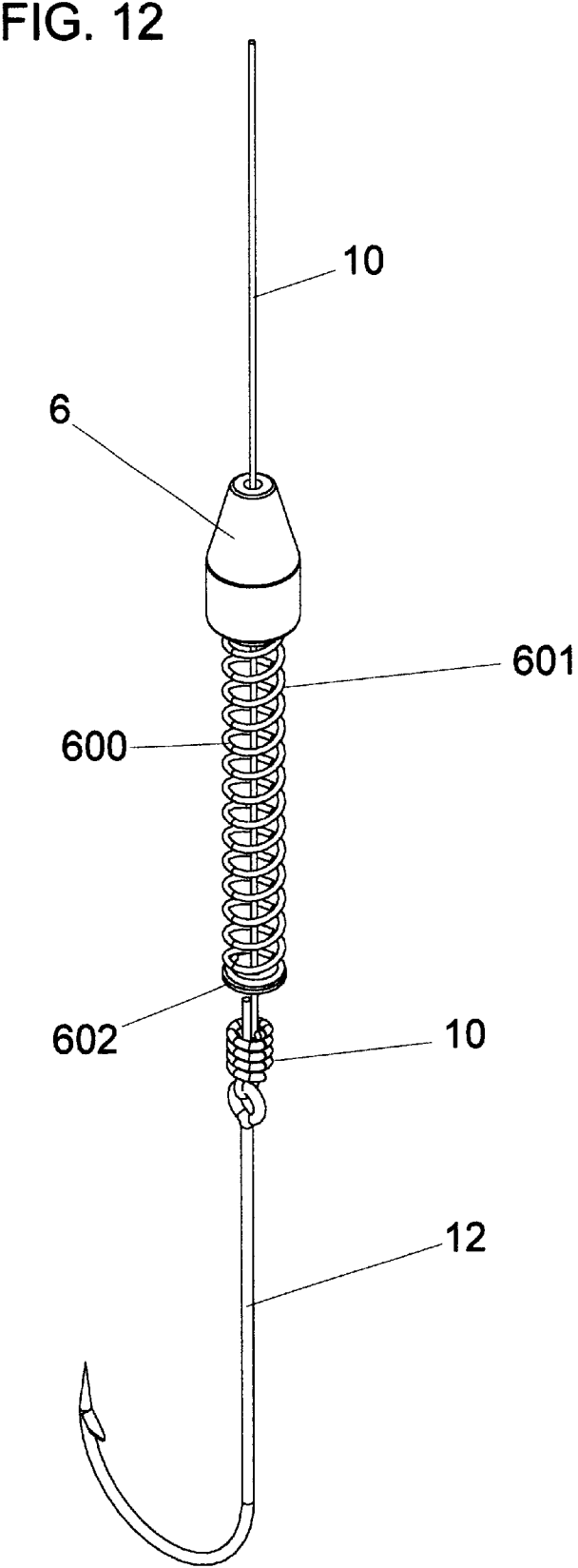
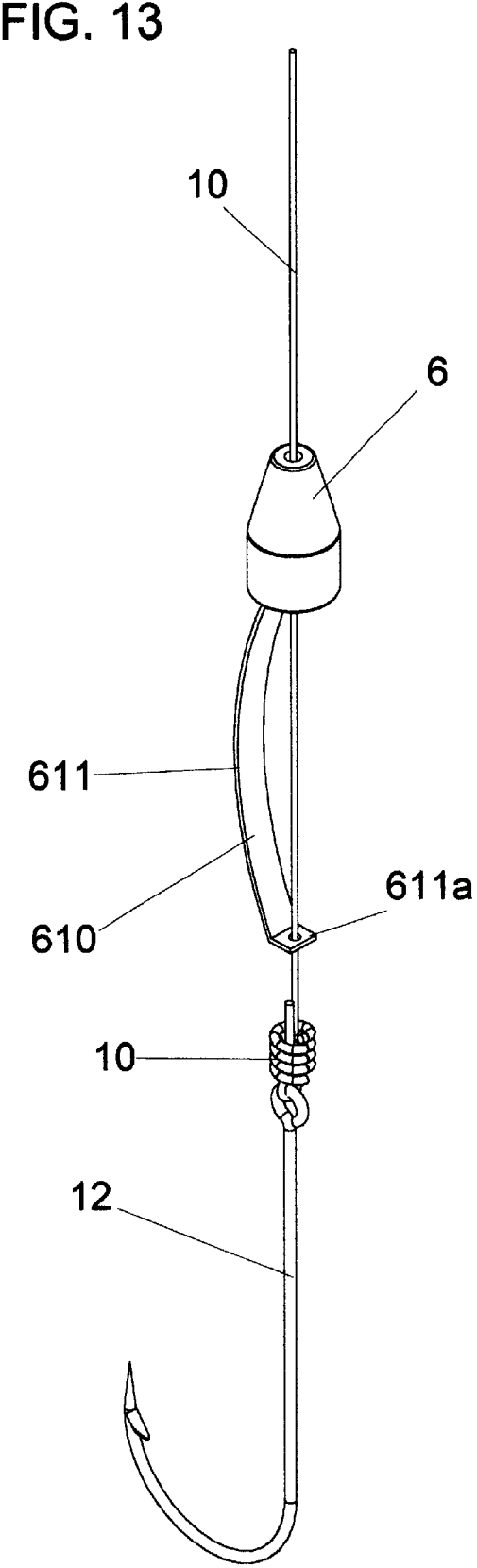
FIG. 12
FIG. 13 ns apparatus 1 com-
FISHERS APPARATUS

CROSS REFERENCE TO RELATED APPLICATIONS

U.S. Provisional Application for Patent No. 60/270,477 of Feb. 21, 2001, "Fishers Apparatus", which is incorporated by reference in its entirety.

U.S. Provisional Application for Patent No. 60/276,582 of Mar. 15, 2001, "Fishers Apparatus Rev. A", which is incorporated by reference in its entirety.

Applicant claims priority of the above Provisional Applications for Patent pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not applicable

BACKGROUND OF THE INVENTION

1. Field of the Invention

The present invention is an apparatus for fishers that enables a fisher to impart a lifelike action to bait which attracts fish.

2. Background Information

Fishers work hard to improve the art and science of catching fish. Large sums and considerable efforts are applied to the end of catching fish more efficiently. A problem in fishing with bait, is attracting the attention of a fish to that bait. Bait, whether live or artificial, has its limitations.

This is a very crowded art. Two typical patents, using either a spring action or a flexible line, are:

U.S. Pat. No. 2,759,290 Strausser Aug. 21, 1956

U.S. Pat. No. 5,279,066 Camera Jan. 18, 1994

Strausser is intended to provide immediate tension on a hook, when struck by a fish, without disturbing the sinker.

Camera is intended to provide limited and highly responsive elasticity in the fishing line as built in assistance in setting the fishing hook upon a strike.

Neither Strausser or Camera is directed to, or imparts, a life like action to bait to attract fish.

As will be seen in the subsequent description, the preferred embodiment of the present invention overcomes shortcomings of exisitng fishing apparatus.

SUMMARY OF THE INVENTION

The present invention, in the preferred embodiment, is a fishers apparatus comprising a drag and an elastic member, wherein the elastic member is between the drag and bait attached to a fishing line. This apparatus enables a fisher to impart a lifelike motion to the bait which is effective in attracting fish to strike at the bait.

The bait can be live or artificial.

Examples of suitable drags comprise a weight and also devices that provide a resistance when motion is imparted, such as, but not restricted to, hooks or anchors that snag on items under the water or the ground under the water.

Examples of the elastic member comprise an elastomer with or without a stretch limiter, a bungee cord, and various spring combinations.

In the preferred embodiment of the present invention, the bungee cord comprises at least one rubber cord encased in a fiber known as SPECTRA 2000.

Alternate embodiments of the bungee cord comprise other members of polyethylene fibers.

BRIEF DESCRIPTION OF THE DRAWINGS

FIGS. 1, 2, and 2A illustrate a preferred embodiment of the present invention, a fishers apparatus comprising an elastic member and a drag. A hook is between the apparatus and a fisher (not shown).

FIGS. 5, 5A, 6, 7, 8, 9, 10, 10A, 11, 11A, 12, 13, 14, 14A, 15, 15A, 16, 17, 18, 19, 20, and 21 illustrate additional alternate embodiments of the present invention.

DESCRIPTION OF THE PREFERRED EMBODIMENTS

Figure 3:
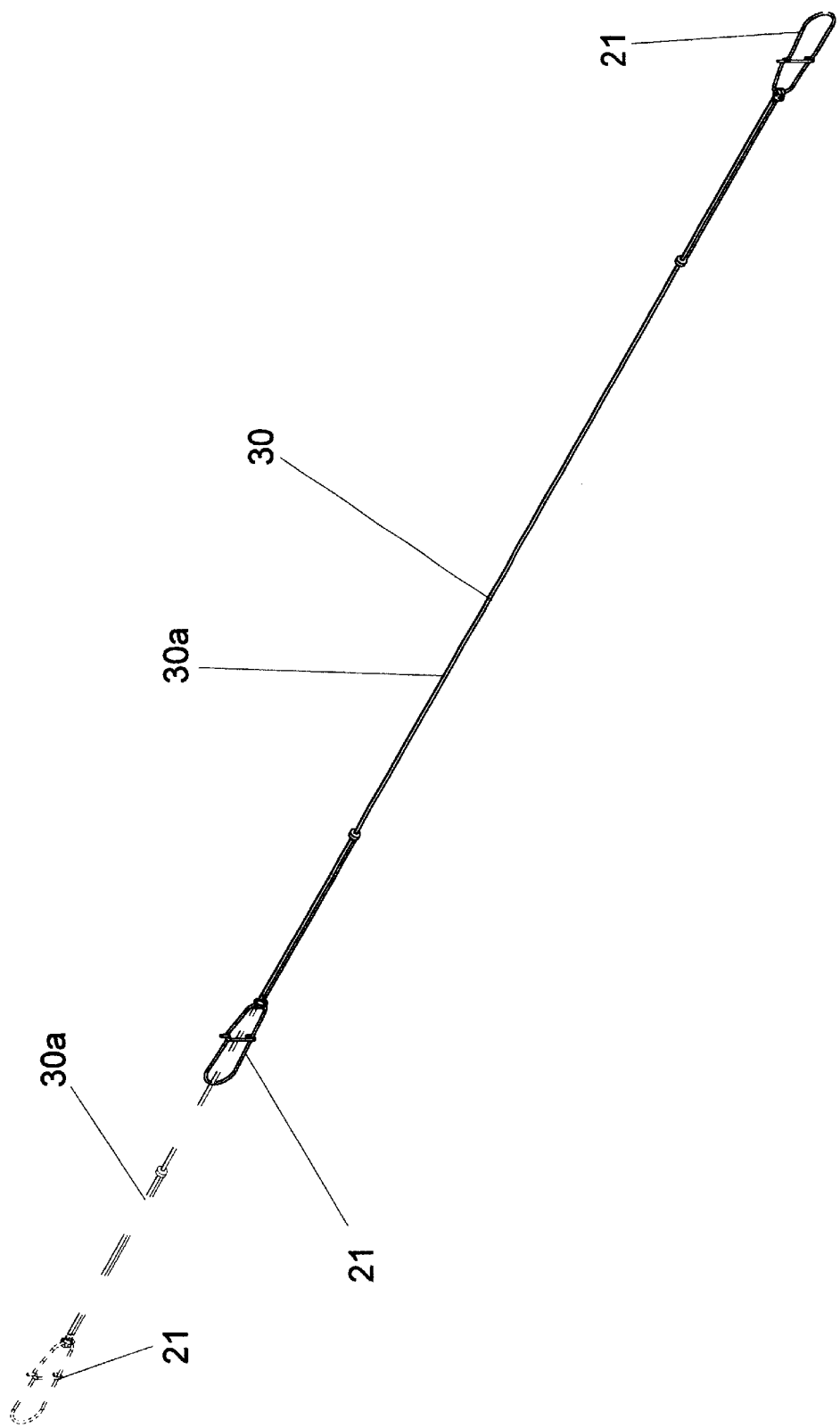
FIG. 3 illustrates a first alternate embodiment of the present invention.

Referring to FIGS. 1, 2, 2A and 4, the preferred embodiment of the present invention, a fishers apparatus 1 comprises a body 2, and a drag 3.

The body 2 further comprises a cap 2c, a protective sleeve 2e, and elastic assembly 20 and clips 21.

The protective sleeve 2e comprises a clearance 2d.

The elastic assembly 20 further comprises an elastic member 20a and a stretch limiter 20b. A purpose of the stretch limiter 20b is to serve as a means of limiting stretching of the elastic member 20a.

FIGS. 2 and 2A illustrate a best mode of the elastic assembly 20 wherein the elastic member 20a is an elastomeric compound such as, but not limited to Buna N, while the stretch limiter 20b is of a suitable textile or fabric such as, but not limited to SPECTRA (Reg. Trade Mark of Allied Signal, now Honeywell), KEVLAR (Reg. Trade Mark of Dupont), cotton, nylon, or rayon. However, as obvious to anyone skilled in the art, other materials would serve the same purpose, albeit perhaps not as well.

Figure 4:
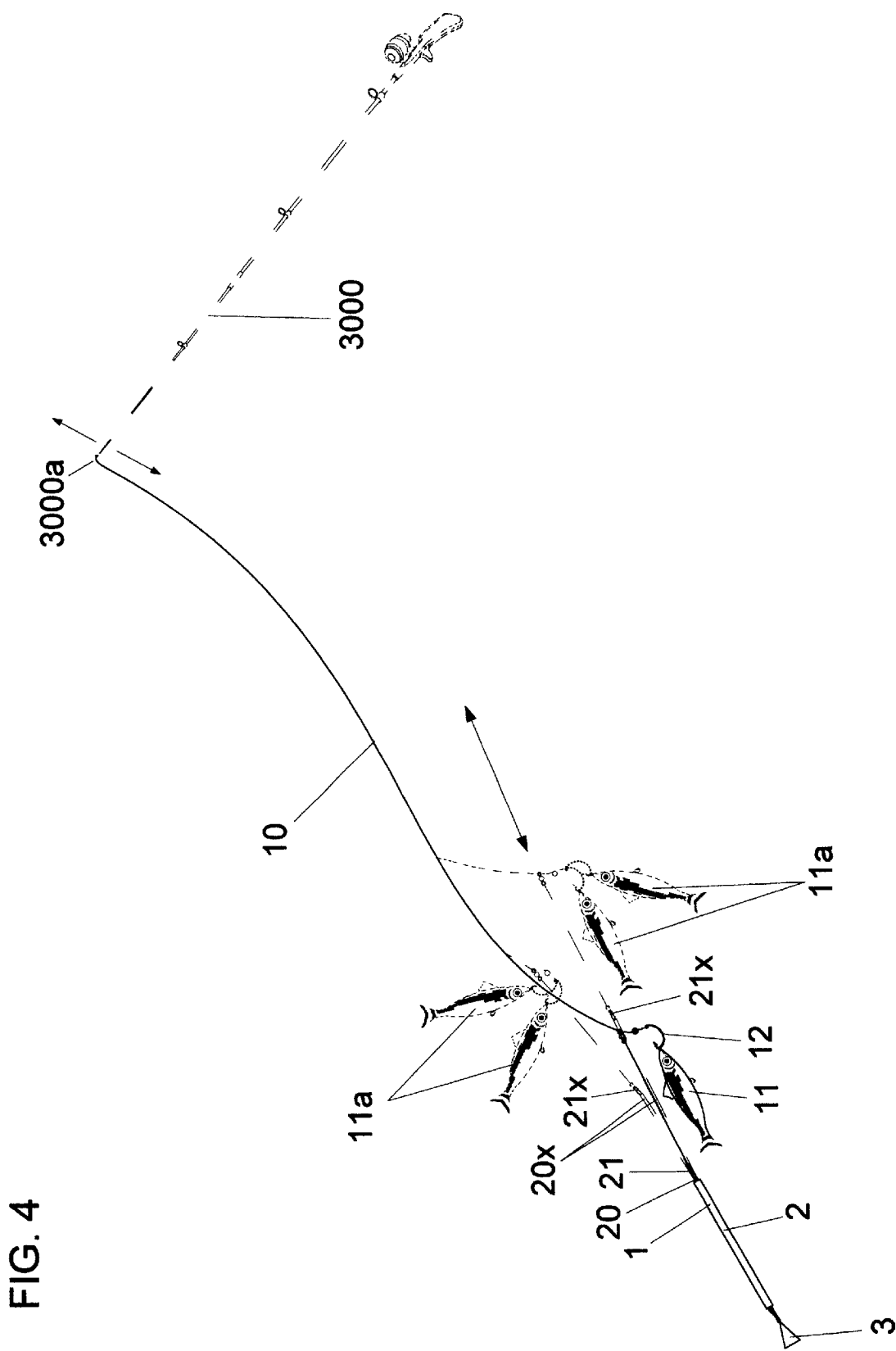
FIG. 4 illustrates how the present invention works.

The drag 3 is connected to the clip 21 which is shown attached to the elastic assembly 20 in FIGS. 1 and 2, said elastic assembly 20 being contained within the clearance 2d of the protective sleeve 2e of the body 2, as shown in FIG. 2, said elastic assembly 20 being also connected to the cap 2c, which is connected to a second clip 21, to which a line 10, with a hook 12, is shown attached, as indicated in FIGS. 1 and 4.

In FIG. 2, the dashed figure clip 21 indicate an extended position of said clip 21.

By pulling on the line 10, a lifelike action is imparted to bait 11 on the hook 12 on the line 10, by the fishers apparatus 1.

Figure 21:
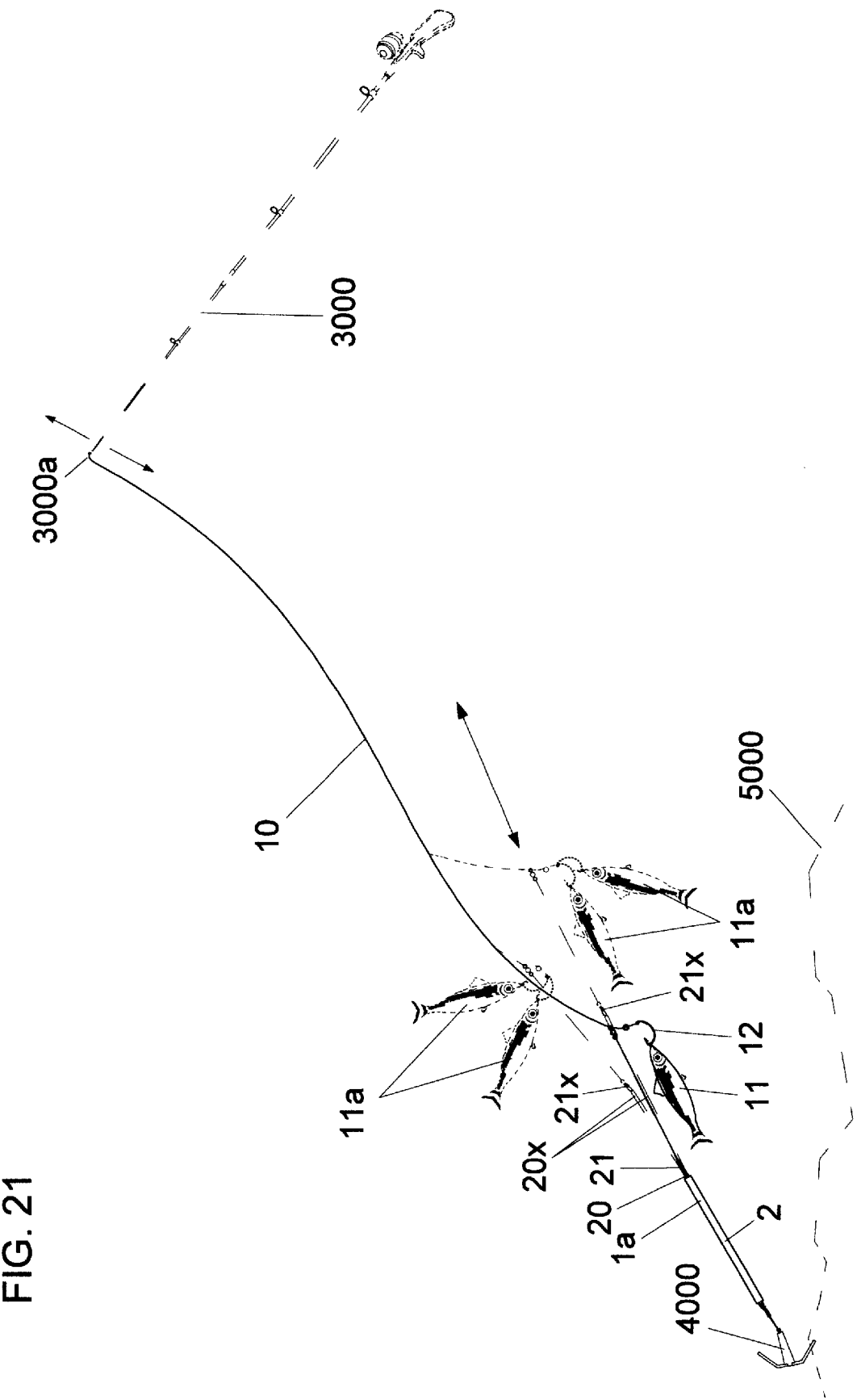

The lifelike action is indicated by bait 11 alternate positions 11A, illustrated in FIG. 4 (Ref. also FIG. 21.)

An arrow indicates direction of motion of the fishers apparatus 1. Ref. also FIG. 21 for an arrow indicating direction of motion of a sixteenth alternate fishers apparatus 1A.

The hook 12 is attached to the line 10 between the fishers apparatus 1 and a fisher (not shown).

As a best mode enablement, the line 10 is jerked upward, such as either by hand or by a rod tip 3000a of a fishing rod 3000, so as to give an upward movement by the bait 11. Arrows indicate rod tip 3000a direction of motion both in FIGS. 4 and 21.

The drag 3 causes a resistance to movement of the body 2, so the elastic member 20a (Ref. FIG. 2A) of the elastic assembly 20 is stretched, resulting in extended positions of the clip 21 and the attached elastic assembly 20 indicated by the numbers 20X and 21X in FIG. 4. Refer also to FIG. 21 for a similar action with the sixteenth alternate fishers apparatus 1a). Then the line 10 is given slack, resulting in a lifelike motion of the bait 11. This has proven effective in catching bass and walleye in national contests.

Referring to FIGS. 1, 2, 4, and 21, in operation the fishers apparatus 1, or said fishers apparatus 1a, is placed on the fishing line 10 using clip 21. The fishing line 10 comprises the hook 12. Either live or artifical bait 11 can be placed on the hook 12 to attract a fish. Once on the line 10, the fishers apparatus 1 or said fishers apparatus 1a, is cast into a body of water. The drag 3, or an alternate drag 4000, will typically sink to the bottom 5000 (Ref. FIG. 21) of the water and serve to anchor the fishers apparatus 1 or said fishers apparatus 1a. Once in position, a very small force, usually a small fraction of one pound is applied to the line 10. This force is sufficient to stretch the elastic assemby 20 to the extended position shown in FIGS. 2 and 4. In its extended position the elastic assembly 20 is suspended between the drag 3 or the alternate drag 4000, and the slightly tense line 10. In this position very small movements or variations in the force applied to the line 10 are amplified into erratic lifelike movements in the bait 11 as shown in FIG. 4. The alternate drag 4000, in the preferred embodiment, is represented as a grapple in FIG. 21. However, the alternate drag 4000 may comprise any sort of means of snagging a bottom 5000 or weeds on such a bottom, so as to provide a resisitive force to a line 10 pull so as to stretch an elastic member 20a (Ref. FIG. 2A) providing for line tension which, when jiggling the line 10, results in lifelike motion of the bait 11.

Experience has shown that even the heart beat of the person holding the line 10 will cause substantial lifelike motion in the bait 11. Under normal conditions the bait 11 is in constant motion because of these very slight variations in force in the line 10. Typically the drag 3 is in the range of less than an ounce up to a pound. The force required to fully extend the elastic assembly 20 is typically in the range of up to a pound. The elastic assembly 20 must be much more elastic than the fishing line. The maximum stretch of the elastic assembly 20 is typically in the range from a fraction of an inch up to a foot.

In addition to casting the drag 3 so that it falls to the bottom of the water, it can also be cast, for example, to a bank near the water so that the hook 12 and the elastic assembly are still in the water. Again, resistance of the drag 3 allows the user to create lifelike motions in the bait 11 as described above. Although the operation has been described specifically for the embodiments of FIGS. 1, 2, and 4, the operation for the other embodiments is similar.

FIG. 3 illustrates a first alternate embodiment fishers apparatus 30 comprising the clips 21, and a first alternate elastic assembly 30a, said assembly 30a serving the same purpose as, and comprised of, the same materials as the elastic assembly 20. As can be seen by comparing FIGS. 2 and 3, the primary difference between said assembly 30 and said body 2 is the cover 2e over the elastic assembly 20 as compared to said assembly 30a which does not have a cover 2e. The cover 2e gives some protection to the elastic assembly 20.

In FIG. 3, an extendable condition of said aparatus 30 is indicated by broken lines.

Figure 5:
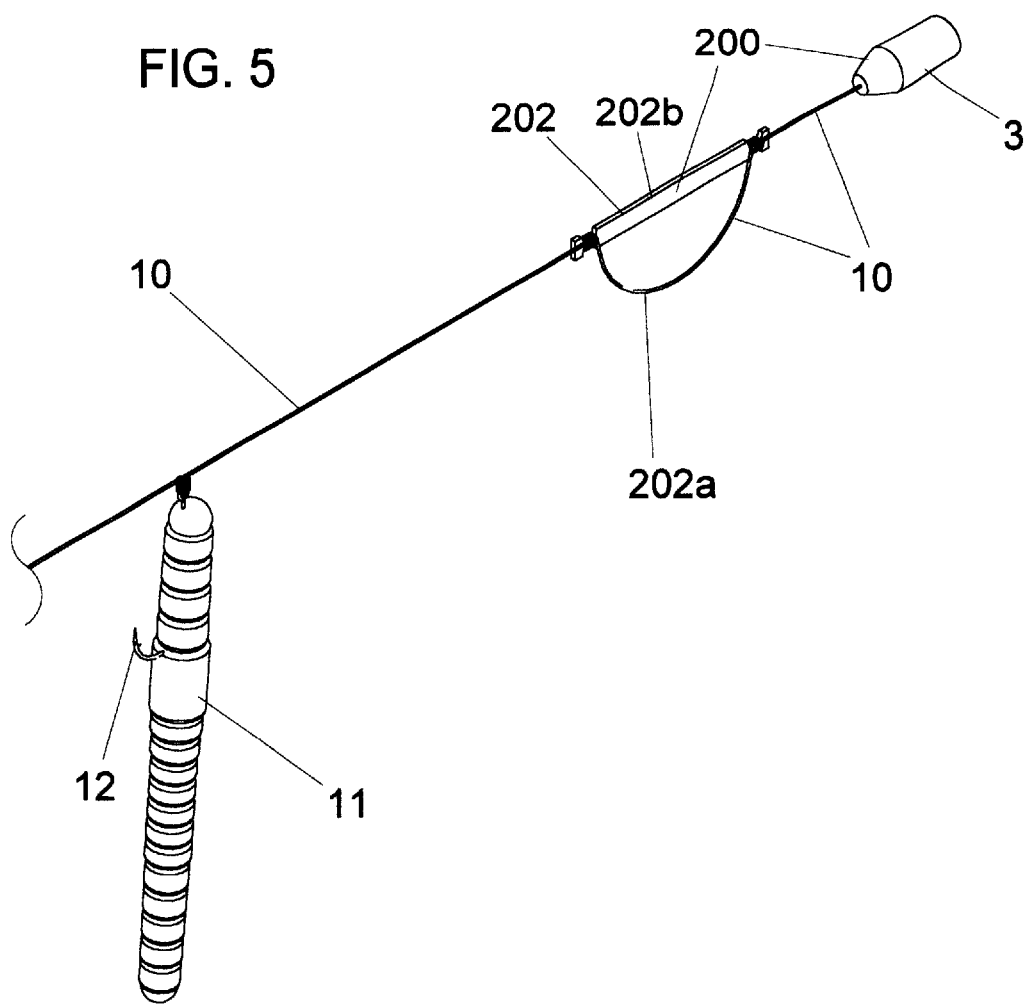

FIG. 5 illustrates a second alternate embodiment fishers apparatus 200 comprising an elastic assembly 202 and a drag 3. The elastic assembly 202 comprises an elastic membrane 202b with a stretch limiter 202a. The drag 3 is attached by the line 10 to the proximate end of the stretch limiter 202a and again to the distal end of the elastic membrane 202b, with some slack in the line 10 between the distal and proximate elastic membrane 202b ends, said slack serving as the stretch limiter 202a, in the preferred embodiment of the second alternate embodiment fishers apparatus 200.

The hook 12 with the bait 11 is attached to the line 10 indicated by the breakway line, said hook 12 being between the fishers apparatus 200 and a fisher (not shown).

Figure 5A:
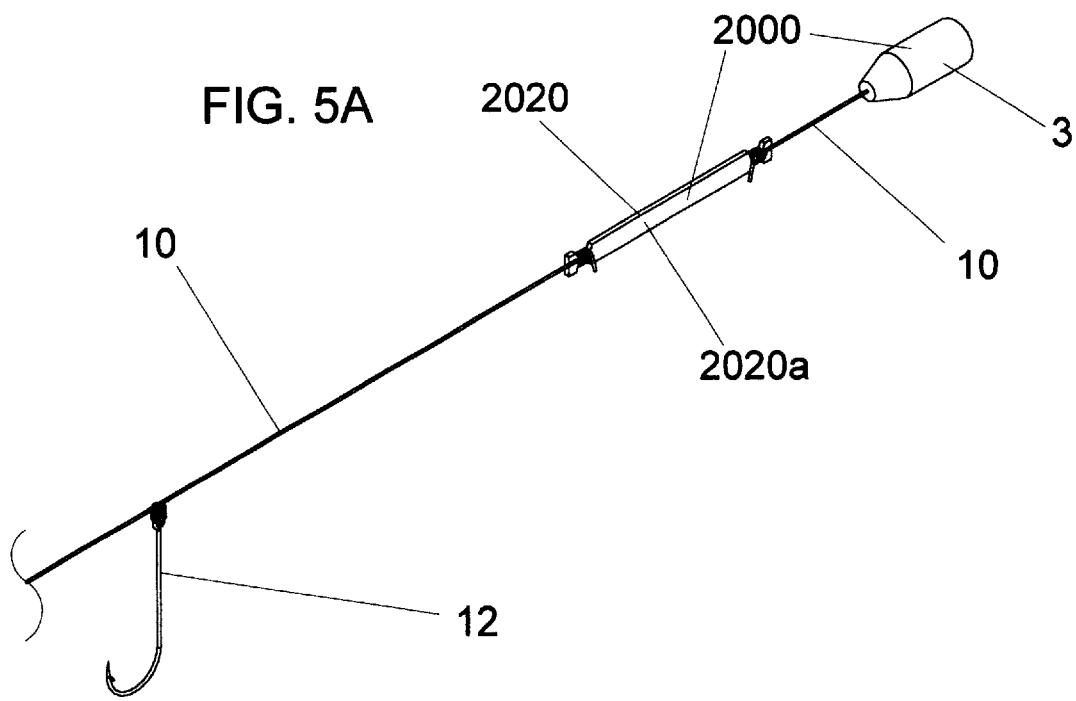

FIG. 5A illustrates a sixteenth alternate embodiment fishers apparatus 2000 comprising the drag 3 and a sixteenth alternate flexible member 2020 wherein the drag 3 is attached to said flexible member 2020 by means of the line 10 and the hook 12 is attached to said flexible member 2020 by the line 10. In this embodiment, the absence of stretch limiter will probably result in a shorter service live of said flexible member 2020, but said apparatus 2000 will serve to impart live action to a bait on the hook 12, said hook 12 attached also to the line 10, shown with a breakaway line, that is between said fishers apparatus 2000 and a fisher (not shown).

As indicated in FIGS. 6 and 7, a third alternate embodiment fishers apparatus 300 comprises a housing 301, a spring assembly 302, and an alternate drag 6.

The housing 301 comprises an aperture 301a and a bore 301b.

The spring assembly 302 comprises a coiled spring 302a, a shaft 302b, and a spring retainer 302c.

The shaft 302b comprises a rod eye 302d.

The alternate drag 6 comprises a drag clearance 6a.

The coiled spring 302a, which is contained in the housing 301, serves as an elastic member.

The spring retainer 302c is attached to the shaft 302b. The alternate drag 6 is slideable along the shaft 302b. The line 10 of FIG. 1 would be tied to the rod eye 302d of the shaft 302b, so said fishers apparatus 300 would serve the same function as the fishers apparatus I shown in FIGS. 1 and 4.

FIGS. 8 and 9 illustrate a fourth alternate embodiment fishers apparatus 400 comprising an alternate housing 401, an alternate shaft 402b further comprising an alternate shaft rod eye 402d, an alternate spring retainer 402c which is attached to the alternate shaft 402b, and an alternate coil spring 402a. the alternate housing 401 further comprises an alternate housing aperture 401a and an alternate bore 401b. When the alternate shaft 402b is extended from the alternate housing 401, the alternate coil spring spring 402a, which is contained in the alternate bore 401b within the alternate housing 401, is compressed.

Said fishers apparatus 400 serves the same function as the body 2 and the drag 3 shown in FIGS. 1 and 4. The alternate coiled spring 402a serves as a flexible member. The alternate housing 401 serves not only to house and shield the alternate coiled spring 402a, but also to serve as a drag means.

FIGS. 10 and 10A illustrate a fifth alternate embodiment fishers apparatus 500 comprising a second alternate housing 501 and an extension spring 502b.

Said housing 501, which serves as a drag means as well as a flexible member stretch limiter, comprises a second alternate housing clearance 501a, and a spring stretch limitation 501b.

As shown in FIGS. 10, 10A, 11, and 11A, the extension spring 502b, which serves as a flexible member means, comprises coil extensions 502a, a first spring end 502c, and a second spring end 502d.

FIG. 10 illustrates said apparatus 500 at rest.

FIG. 10A illustrates said apparatus 500 in an extended position.

In use, the line 10 (Ref. FIGS. 1 and 4) would be tied to the first spring end 502c, with a hook 12 secured to the line 10 upline from said fishers apparatus 500, as is hook 12 placement shown in FIGS. 1 and 4.

FIGS. 11 and 11A illustrate a sixth alternate embodiment fishers apparatus 550 comprising an alternate stretch limiter 551 and the extension spring 502b.

The stretch limiter 551 of said apparatus 550 serves in place of said housing 501 as shown in FIGS. 10 and 10A, said stretch limiter 551 further comprising spring travel limits 551a.

Depending on the weight of said apparatus 550, said apparatus 550 serves as its own drag means. In the event of insufficient weight, a drag, such as the drag 3 from FIG. 1 can be attached to the second spring end 502d to increase drag.

FIG. 12 illustrates a seventh alternate embodiment fishers apparatus 600 comprising a compression coil spring 601, which serves as a flexible member means, a compression coil spring retainer 602, and the alternate drag 6.

FIG. 13 illustrates an eighth alternate embodiment fishers apparatus 610 comprising a leaf spring 611, which serves as a flexible member means, and the drag 6.

The leaf spring 611 comprises at least one leaf spring aperture 611A which permits passage of the line 10.

The line 10 is shown in FIGS. 12 and 13 tied to the hook 12.

Figure 14:
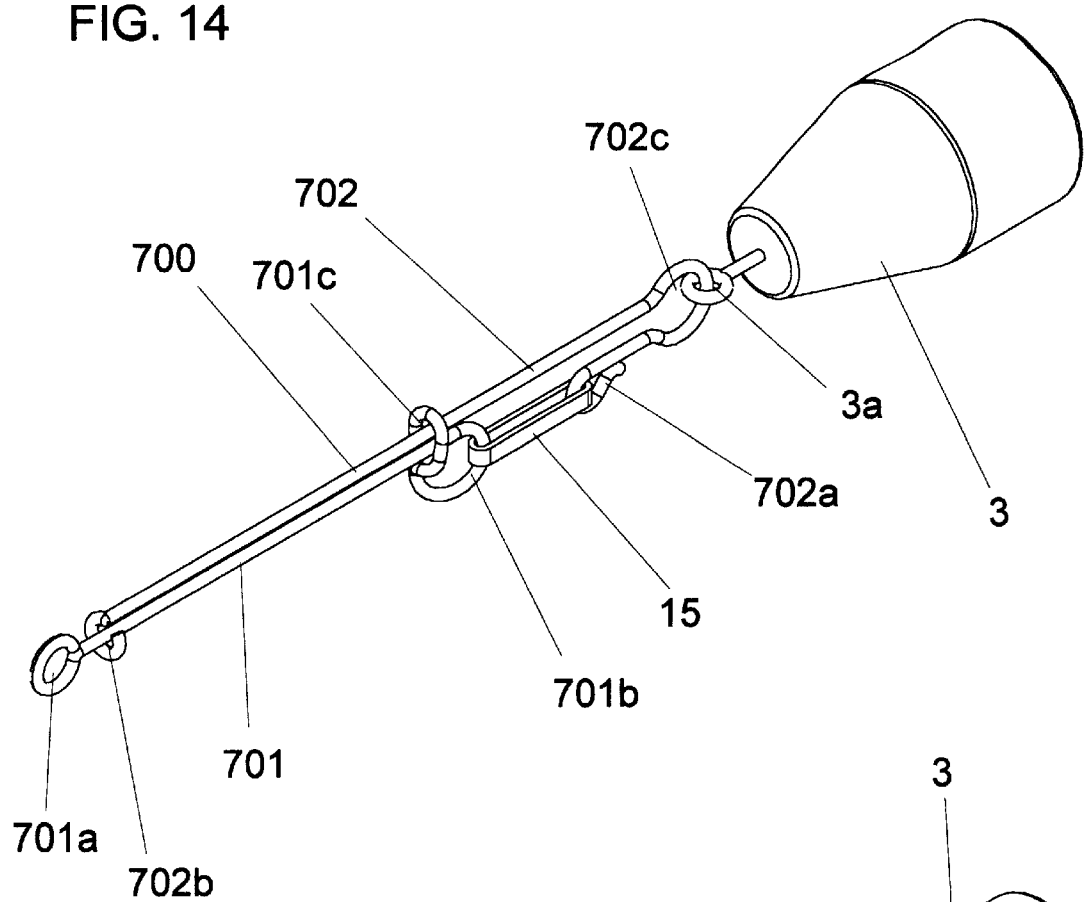
Figure 14A:
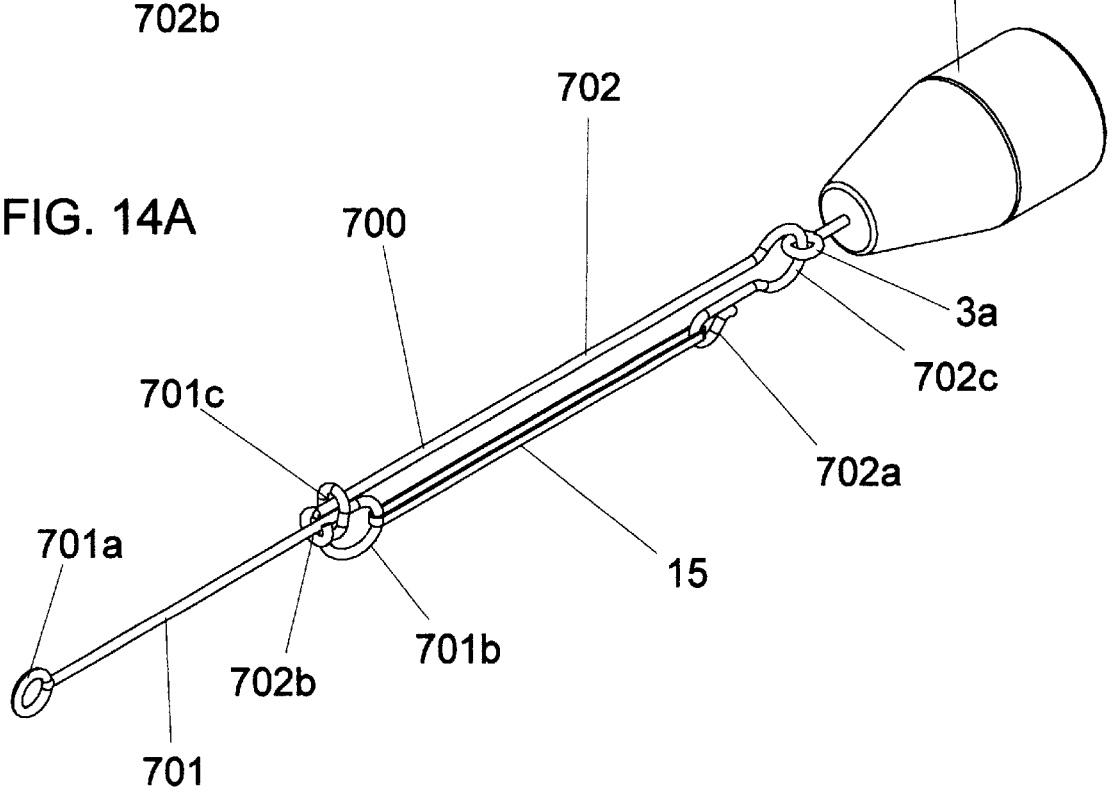

FIGS. 14 and 14A illustrate a ninth alternate embodiment fishers apparatus 700 comprising a distal structure 701, a proximate structure 702, a ninth alternate embodiment flexible member 15, and the drag 3 which further comprises a drag aperture 3a.

The distal structure 701 comprises a line aperture 701a, a flexible member loop 701b, and a proximate structure support 701c.

The proximate structure 702 comprises a proximate structure flexible member loop 702a, a distal structure support 702b, and a drag loop 702c.

Said flexible member 15, in the preferred embodiment is an elastomeric band, such as, but not restricted to, a common rubber band, with said flexible member 15 around said loop 702a of said structure 702 and also said loop 701b of said structure 701.

The drag aperture 3A is engaged by the drag loop 702c of said structure 702.

Said structure support 702b of said structure 702 supports said structure 701 which is slideable with respect to said structure 702 within said structure support 702b.

Said structure support 701c of said structure 701 supports said structure 702 and serves to help stabilize said structure 701 as it slides with respect to said structure 702.

With the line 10 (Ref. FIGS. 1 and 4) tied to the line aperture 701a shown in FIGS. 14 and 14A, said apparatus 700 performs similarly to said fishers apparatus 1 as shown in FIG. 4.

Said structure supports 701c and 702b serve as a means of limiting stretch of said flexible member 15.

FIG. 14 illustrates said apparatus 700 in a non extended position.

FIG. 14A illustrates said apparatus 700 in an extended position.

Figure 15:
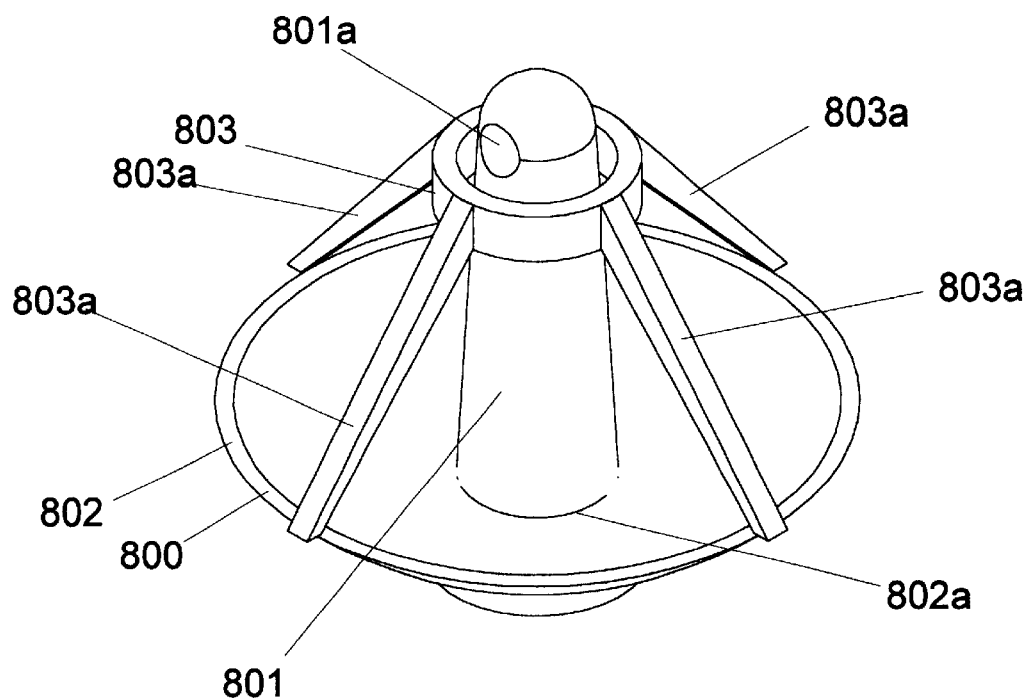
Figure 15A:
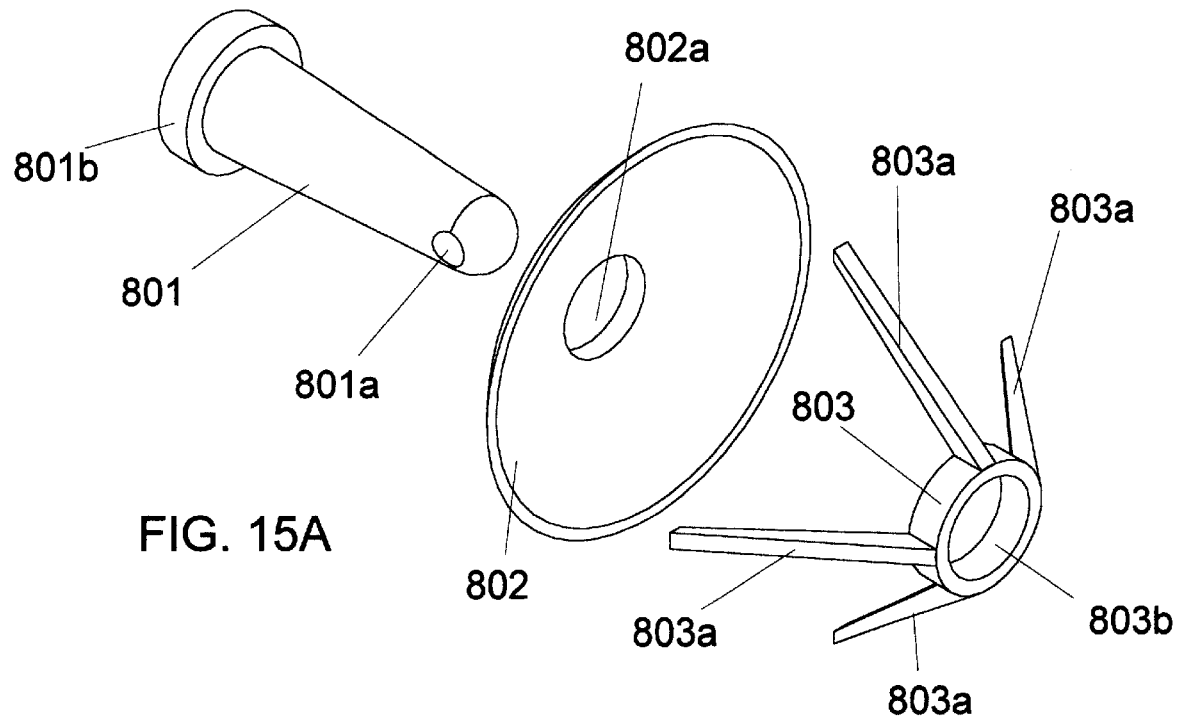

FIGS. 15 and 15A illustrate a tenth alternate embodiment fishers apparatus 800 comprising a tenth alternate embodiment shaft 801, a tenth alternate embodiment drag 802, and a tenth embodiment flexible member 803.

Said shaft 801 comprises a line attachment aperture 801a and a drag retainer stop 801b.

Said drag 802 comprises a tenth alternate embodiment shaft clearance 802a.

Said flexible member 803 comprises spring legs 803a, and a tenth alternate embodiment shaft aperture 803b.

Said shaft 801 is inserted through said clearance 802 of said drag 802 and also through said aperture 803b of said flexible member 803, with the line 10 (ref. FIG. 10), attached to said aperture 801a, similar results are obtained as are obtained in FIG. 4 with the fishers aperture 1.

Materials suitable for said flexible member 803 could be plastic, elastomeric, or a flexible metal such as steel, or any other suitable material with appropriate properties.

Figure 16:
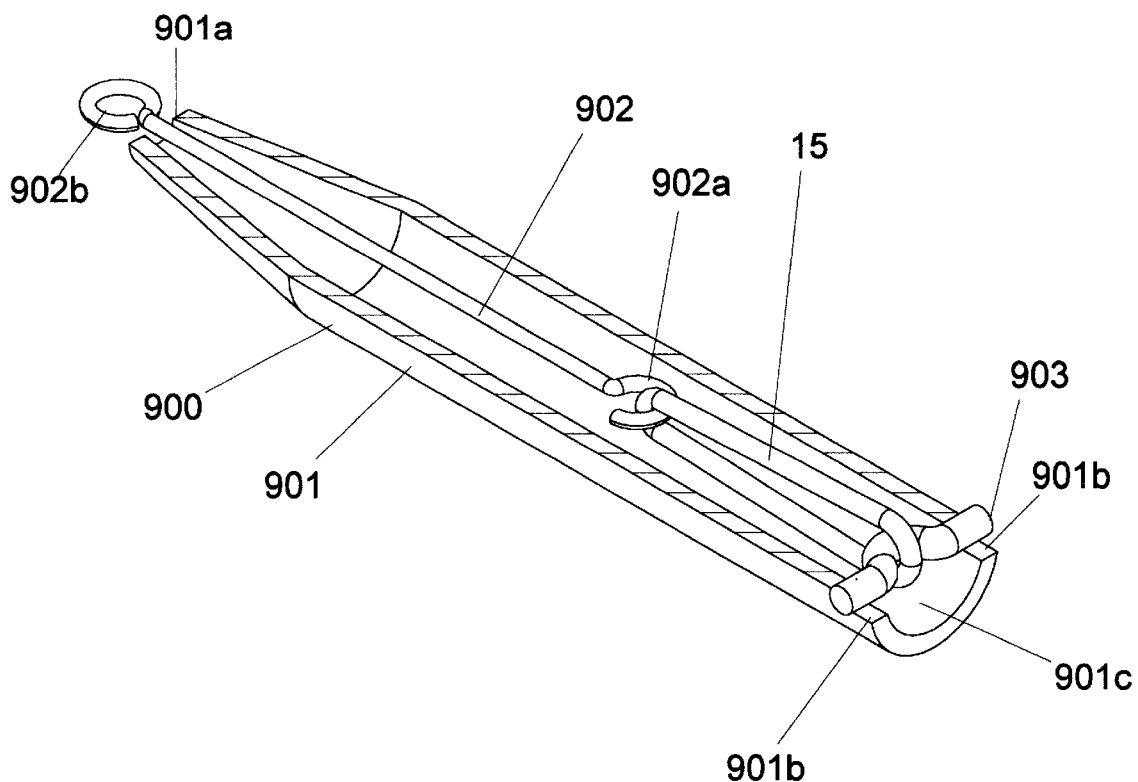

FIG. 16 illustrates an eleventh alternate embodiment of a fishers apparatus 900 comprising a shell 901, a rod 902, a retainer pin 903, and said flexible member 15.

Figure 19:
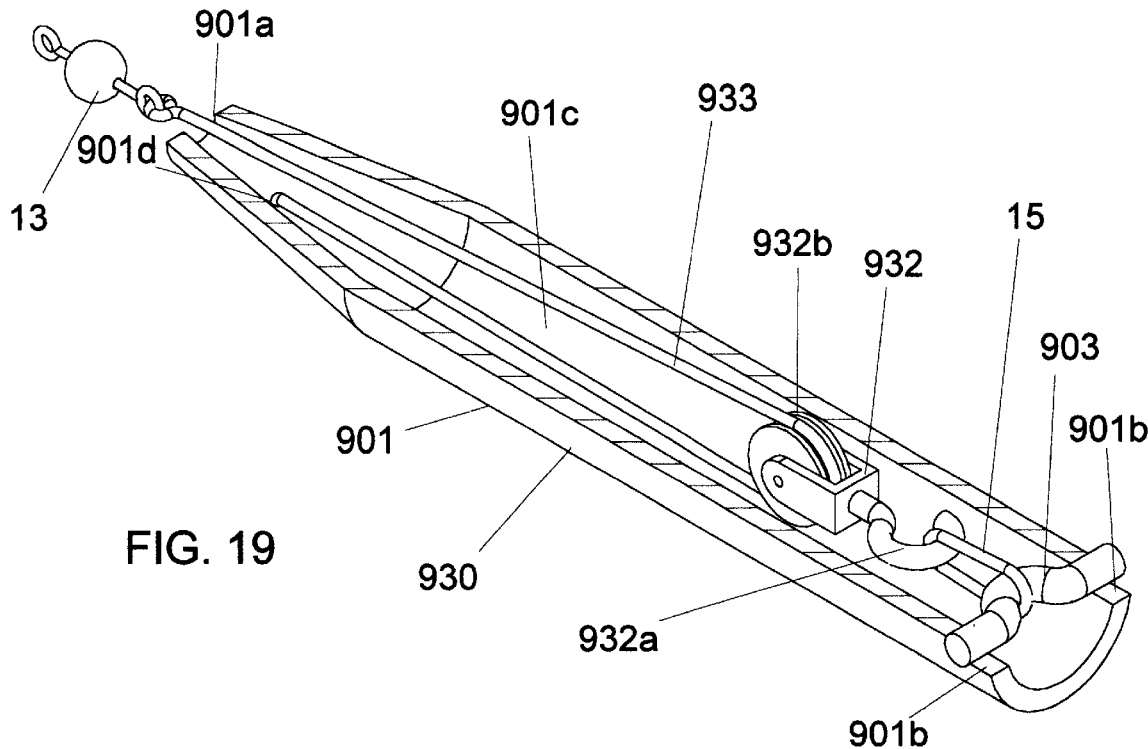

The shell 901, also shown in FIG. 19, comprises a rod clearance 901a, retainer pin slots 901b, and a shell bore 901c.

Figure 17:
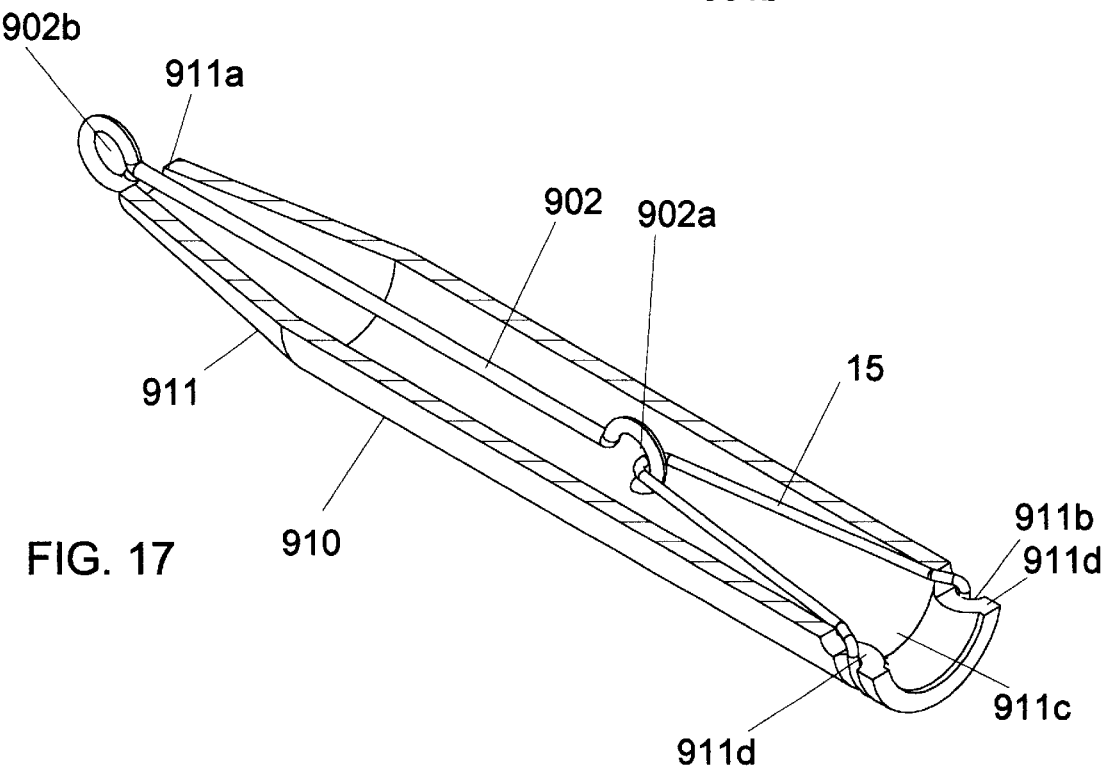

The rod 902, also shown in FIG. 17, comprises a band hook 902a and a rod eye 902b.

Said flexible member 15 is connected to the band hook 902a and the retainer pin 903, said retainer pin 903 held in place in said slots 901b by said flexible member 15.

When the line 10 (Ref. FIG. 4) is connected to the rod eye 902b of the rod 902, similar results are obtained as are obtained in FIG. 4 with the fishers apparatus 1.

The drag function is inherent in said apparatus 900 with sufficient weight of said apparatus 900.

FIG. 17 illustrates a twelth alternate embodiment fishers apparatus 910, which differs from said apparatus 900 in how said flexible member 15 is secured within said apparatus 910.

Said apparatus 910 comprises an alternate shell 911, the rod 902, and said flexible member 15.

Said alternate shell 911 comprises an alternate shell clearance 911a, a groove 911b, and an alternate shell bore 911c, and alternate slots 911d.

Said flexible member 15 is secured to said shell 911 by means of the groove 911b and said slots 911d.

Figure 18:
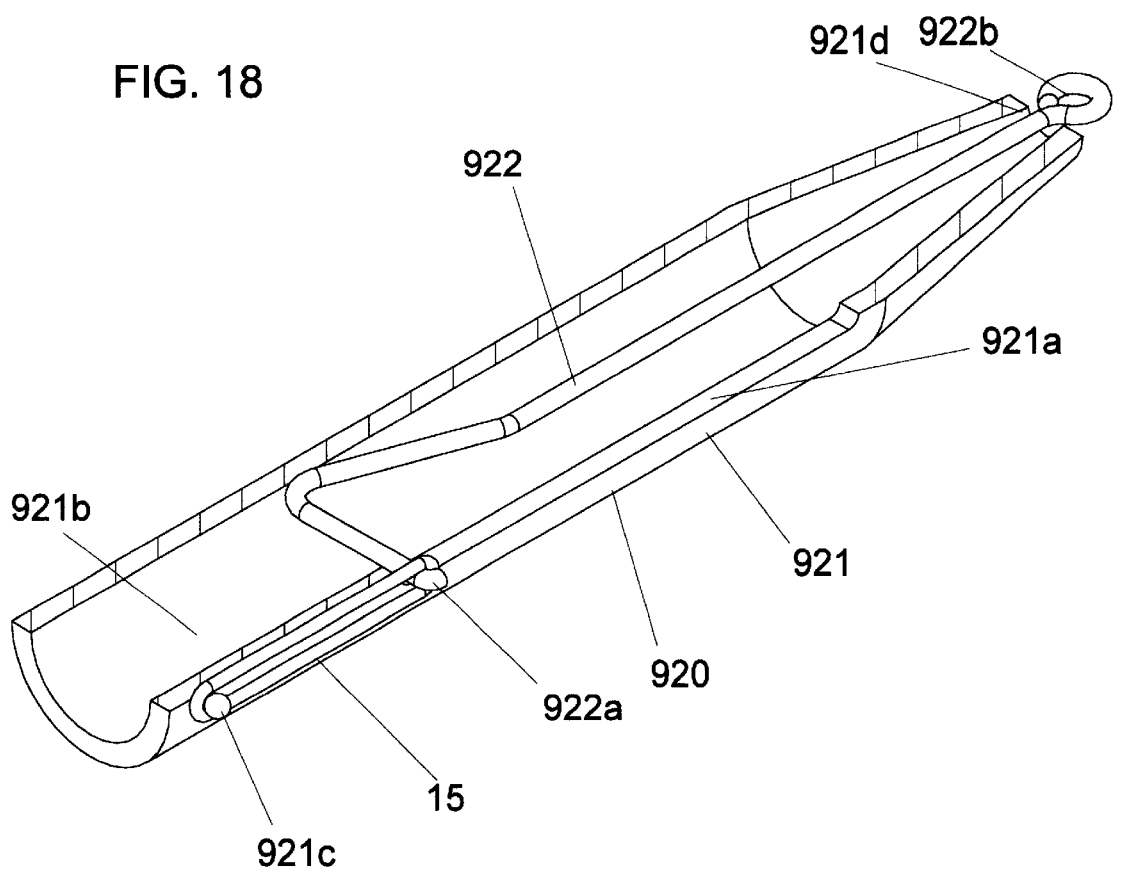

FIG. 18 illustrates a thirteenth alternate embodiment fishers apparatus 920 comprising an alternate housing 921, an alternate rod 922, and the elastic member 15.

The alternate housing 921 comprises an alternate shaft extension slot 921a, a thirteenth alternate bore 921b, an elastic member engagement boss 921c, and a thirteenth alternate end clearance 921d.

The alternate rod 922 comprises an elastic member engagement 922a and a thirteenth alternate rod eye 922b.

The elastic member 15 wraps around said boss 921c of said housing 921 and said engagement 922a of said rod 922, holding said rod 922 retracted within said housing 921, wherein retraction of said rod 922 is limited by said rod 922 resting in said clearance 921d of said housing 921.

Said housing 921 acts as a drag means.

When the line 10 (Ref. FIG. 4) is attached to said rod eye 922b, said fishers apparatus 920 functions as does the fishers apparatus 1, imparting a live action to a bait on a hook such as the bait 11 on the hook 12 shown in FIG. 4.

FIG. 19 illustrates a fourteenth alterenate embodiment fishers apparatus 930 comprising the shell 901, the pin 903, the elastic member 15, and a pulley assembly 932.

The shell 901 further comprises a line clearance 901d.

The pulley assembly 932 comprises a hook 932a, at least one sheave 932b, and a pulley line 933.

The pulley assembly 932 is attached to the elastic member 15 which is attached to the pin 903 which rests in the slots 901b of the shell 901. The pulley line 933 is secured to the shell 901 by inserting a sufficient length to be knotted through said clearance 901d and then tieing a knot in the pulley line 933. The pulley line 933 is also wrapped around said at least one sheave 932b, and threaded through said clearance 901a and then secured to the swivel 13. By having a swivel 13 larger than said clearance 901a, the swivel 13 can nest in said clearance 901a. The swivel 13 is used as a convenient means to secure the pulley line 933.

The shell 901 acts as a drag.

By tieing the line 10, as shown in FIG. 4, to the swivel 13, said fishers assembly 930 will act as the fishers apparatus 1 did, imparting a live action to a bait 11 on a hook 12, as shown in FIG. 4.

Figure 20:
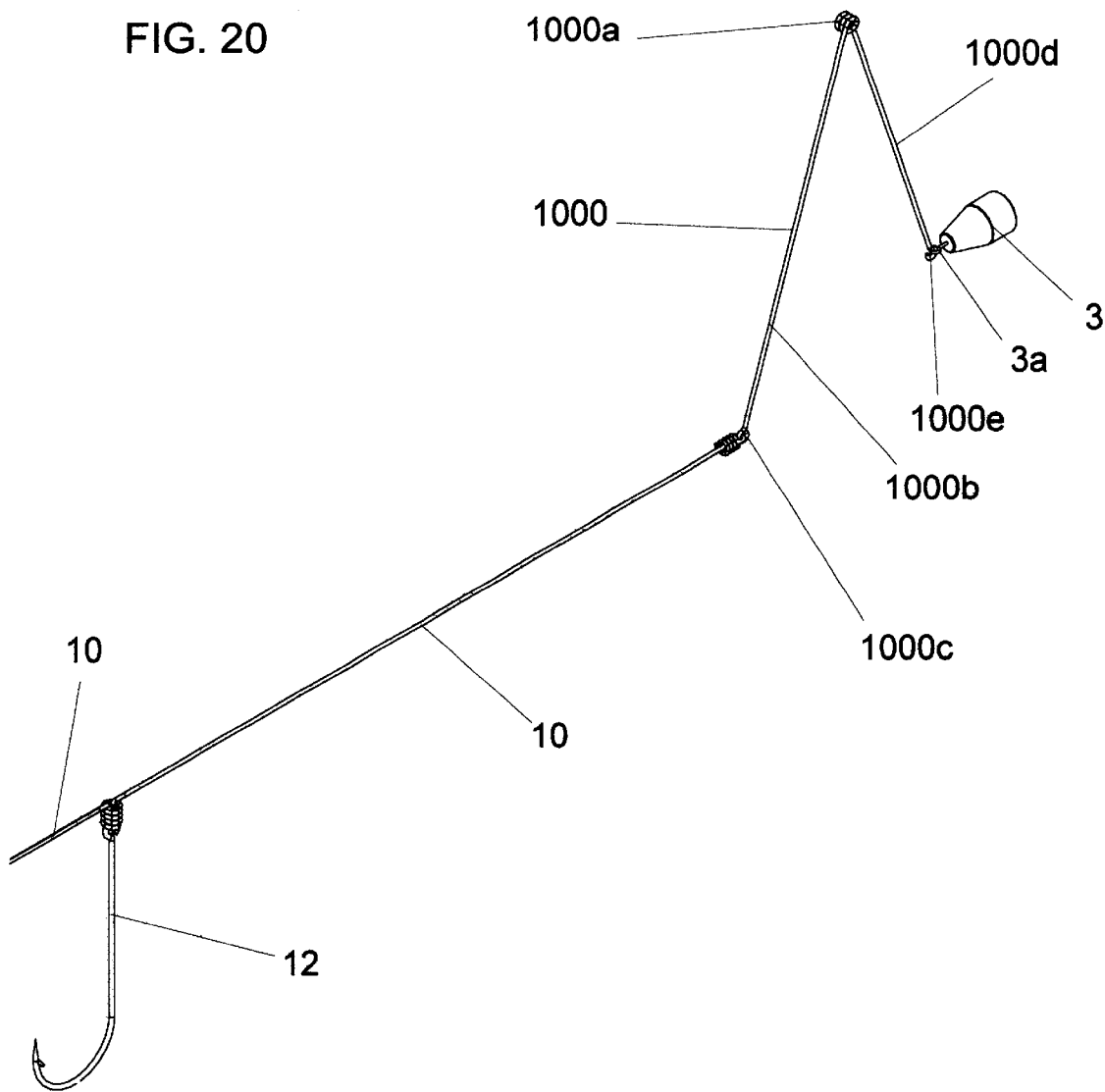

As shown in FIG. 20, A fifteenth alternate embodiment fishers apparatus 1000 is a relatively simple apparatus comprising a fifteenth alternate flexible member 1000b and the drag 3.

Said flexible member 1000b comprises at least one coil 1000a, a line attachment eye 100c, a drag arm 1000d, and a hook eye 1000e.

The drag 3 is attached to said flexible member 1000b by means of the hook eye 1000e, in the preferred embodiment of this alternate embodiment.

When a line such as the line 10, of FIG. 4, is attached to the line attachment eye 1000c, said fishers apparatus 1000 will act as the fishers apparatus 1 does, imparting a live action to the bait 11 on the hook 12 as shown in FIG. 4.

Although the description above contains many specificities, these should not be construed as limiting the scope of the invention but as merely providing illustration of some of the presently preferred embodiments of this invention.

For example, in FIG. 12 a coil spring is shown while in FIG. 13 a leaf spring alternative is shown. These are merely examples of any of a number of spring members that can be made to accomplish the same task.

Also, there are a number of ways to accomplish the function of the drag 3. The idea is to have a reactive force combined with an elastic element, which allows a fisher to impart motion to the bait.

Also, the bait can be natural or artificial.

Also, while the preferred embodiment of the elastic member comprises a elastomeric elastic member, there are undoubtably many other stretchable materials suitable for use as an elastic member.

As will be obvious to those skilled in the art that modifications may be made to the embodiments described above without departing from the scope of the present invention. Thus the scope of the invention should be determined by the appended claims in the formal application and their legal equivalents, rather than by the examples given.

I claim:

1. A fisher's apparatus comprising:
   a drag,
   an elastic member attached to a fishing line, and
   a hook,
   wherein the elastic member is disposed between the drag and the hook, said hook attached to the fishing line,
   wherein said apparatus enables a fisher to impart a lifelike motion to the hook which is effective in attracting fish to strike at the hook,
   wherein the elastic member comprises a bungee cord comprising at least one rubber cord enclosed in a case comprising a fiber, said case serving to limit the length of stretch of the at least one rubber cord.

2. The fisher's apparatus of claim 1 wherein said case fiber is a fiber comprising SPECTRA.

3. The fisher's apparatus of claim 1 wherein said case fiber is a fiber comprising KEVLAR.

4. A fisher's apparatus comprising:
   a drag means,
   an elastic member having a first and a second end,
   a fishing line and a hook, wherein said hook is directly attached to said line and spaced from an end of said line and wherein said first end of the elastic member is attached to said line adjacent to said end of said line and wherein said drag means is attached to said second end of said elastic member such that said drag means applies a reactive force to said first end of said elastic member when a force is applied to said line, wherein the elastic member comprises at least one rubber cord enclosed in a case comprising a fiber, said case serving to limit the length of stretch of the at least one rubber cord.

* * * * *